United States Patent
Khati et al.

(10) Patent No.: US 12,335,048 B2
(45) Date of Patent: Jun. 17, 2025

(54) EFFICIENT COMMUNICATION IN LIMITED RESOURCE ENVIRONMENTS

(71) Applicant: Apple Inc., Cupertino, CA (US)

(72) Inventors: Dhruv Khati, San Jose, CA (US); Shiva Krishna Narra, San Jose, CA (US); Krishna Myneni, Santa Clara, CA (US); Sanjeevi Balasubramanian, San Jose, CA (US); Anjaneyulu Maganti, San Jose, CA (US)

(73) Assignee: Apple Inc., Cupertino, CA (US)

( * ) Notice: Subject to any disclaimer, the term of this patent is extended or adjusted under 35 U.S.C. 154(b) by 390 days.

(21) Appl. No.: 17/733,646

(22) Filed: Apr. 29, 2022

(65) Prior Publication Data

US 2023/0085065 A1    Mar. 16, 2023

Related U.S. Application Data

(60) Provisional application No. 63/245,099, filed on Sep. 16, 2021.

(51) Int. Cl.
| | |
|---|---|
| *H04W 4/00* | (2018.01) |
| *H04L 1/00* | (2006.01) |
| *H04L 1/1812* | (2023.01) |
| *H04W 24/04* | (2009.01) |
| *H04W 72/52* | (2023.01) |

(52) U.S. Cl.
CPC ............ *H04L 1/1819* (2013.01); *H04L 1/004* (2013.01); *H04W 24/04* (2013.01); *H04W 72/52* (2023.01)

(58) Field of Classification Search
CPC ....... H04L 1/1819; H04L 1/004; H04L 51/58; H04L 51/226; H04L 51/23; H04L 12/1895; H04W 24/04; H04W 72/52

USPC ......................................................... 370/329
See application file for complete search history.

(56) References Cited

U.S. PATENT DOCUMENTS

| | | | |
|---|---|---|---|
| 6,208,761 B1 * | 3/2001 | Passaggio | H04N 19/51 375/E7.092 |
| 8,645,557 B2 | 2/2014 | Douady et al. | |
| 8,943,144 B2 | 1/2015 | Farrell et al. | |
| 10,608,790 B2 * | 3/2020 | Nammi | H04L 1/08 |

(Continued)

FOREIGN PATENT DOCUMENTS

| | | |
|---|---|---|
| CN | 101901542 A | 12/2010 |
| CN | 107078857 A | 8/2017 |

(Continued)

OTHER PUBLICATIONS

Final Rejection for Japanese Patent Application No. 2022-104818, dated Jul. 4, 2024; 3 pgs.

(Continued)

*Primary Examiner* — Chuong T Ho
(74) *Attorney, Agent, or Firm* — FLETCHER YODER PC (57) ABSTRACT

An electronic device may detect a message request to send one or more redundant messages to a response network. The one or more messages may contain information previously sent from the electronic device to the response network. The electronic device may determine an entropy factor corresponding to the relatedness of the one or more messages to previously sent messages, and the electronic device may send one or more redundant bits in the place of the one or more messages if the entropy factor is below a threshold value corresponding to network resources.

20 Claims, 7 Drawing Sheets

(56) References Cited

U.S. PATENT DOCUMENTS

| | | |
|---|---|---|
| 10,957,178 B2 | 3/2021 | Beyer et al. |
| 11,233,628 B2 | 1/2022 | Figueira |
| 2004/0125817 A1 | 7/2004 | Miyazaki et al. |
| 2015/0281168 A1* | 10/2015 | Holloway ............ H04L 61/4511 709/245 |
| 2015/0382284 A1* | 12/2015 | Brismar ................ H04W 48/12 370/329 |
| 2016/0100435 A1* | 4/2016 | Bakker ............... H04L 65/1104 455/404.1 |
| 2016/0192214 A1 | 6/2016 | Yu |
| 2016/0261383 A1 | 9/2016 | Bergström et al. |
| 2018/0165174 A1 | 6/2018 | Ajiro et al. |
| 2019/0081739 A1 | 3/2019 | Nammi |
| 2020/0100082 A1* | 3/2020 | Balasubramanian ... H04W 4/90 |
| 2020/0259661 A1* | 8/2020 | Falk ........................ G06F 21/64 |
| 2021/0144525 A1* | 5/2021 | Yoo ........................... H04L 1/08 |

FOREIGN PATENT DOCUMENTS

| | | |
|---|---|---|
| CN | 111935760 A | 11/2020 |
| EP | 2306424 A1 | 4/2011 |
| EP | 2930852 A2 | 10/2015 |
| JP | 2004187326 A | 7/2004 |
| JP | 2005521938 A | 7/2005 |
| JP | 2006303974 A | 11/2006 |
| KR | 10-2005-0079515 A | 8/2005 |
| KR | 10-2011-0066087 A | 6/2011 |
| WO | 03083667 A1 | 10/2003 |
| WO | 2016199433 A1 | 3/2018 |

OTHER PUBLICATIONS

Notice of Preliminary Examination for Korean Patent Application No. 10-2022-0106746 dated Aug. 22, 2023; 6 pgs.

* cited by examiner

| MESSAGE | ENTROPY % | MESSAGE SEQUENCE (MS) | INFORMATION SEGMENT (IS) | RESOURCE FACTOR | INFO SENT OTA | MS / IS |
|---|---|---|---|---|---|---|
| EMERGENCY-LEG HURT IN FOREST, CANT WALK, NO ONE AROUND | 100 | 1 | 1-EMERGENCY, 2-LEG HURT, 3-FOREST, 4-CANT WALK, 5-ALONE | 100 | ACTUAL MESSAGE | |
| I HAVE HURT MY LEG | 0 | 2 | 2-LEG HURT | 30 | REDUNDANT BIT | MS-1, IS-2 |
| I AM IN FOREST | 0 | 3 | 3-FOREST | 60 | REDUNDANT BIT | MS-1, IS-2 |
| HELP | 80 | 4 | 6-HELP | 50 | ACTUAL MESSAGE | MS-1, IS-2 |
| PLEASE HELP | 0 | 5 | 6-HELP | 30 | REDUNDANT BIT | MS-1, IS-2 |
| I AM IN EMERGENCY | 0 | 6 | 1-EMERGENCY | 30 | REDUNDANT BIT | MS-1, IS-2 |
| HELP | 0 | 7 | 6-HELP | 20 | REDUNDANT BIT | MS-1, IS-2 |
| FOREST | 0 | 8 | 3-FOREST | 50 | REDUNDANT BIT | MS-1, IS-2 |
| NEED HELP | 0 | 9 | 6-HELP | 0 | REDUNDANT BIT | MS-1, IS-2 |
| PLEASE RESPOND | 20 | 10 | 6-HELP | 50 | REDUNDANT BIT | MS-1, IS-2 |

EFFICIENT COMMUNICATION IN LIMITED RESOURCE ENVIRONMENTS

CROSS-REFERENCE TO RELATED APPLICATIONS

This application claims priority to U.S. Provisional Application No. 63/245,099, filed Sep. 16, 2021, entitled, "EFFICIENT COMMUNICATION IN LIMITED RESOURCE ENVIRONMENTS," which is hereby incorporated by reference in its entirety for all purposes.

BACKGROUND

The present disclosure relates generally to wireless communication and more specifically to optimizing or improving wireless communication in environments where device and/or network resources are limited.

A mobile communication device may utilize networks, such as cellular networks, Wi-Fi networks, satellite networks, and the like, to transmit and/or receive data. During high priority communications, such as communications to an incident response network in an emergency situation (e.g., injury, earthquake, hurricane), users of a mobile device may send one or more redundant messages from the user's mobile device to the response network. The redundant messages may result in delays to communicating important information to the response network. Further, the redundant messages may result in network congestion, which may decrease or delay information sent or received by the response network during emergency situations. Additionally, mobile device transmissions may be impacted by the location of the device and/or environmental conditions of the device location. This may further lead to incomplete data transmissions, and latency in communications sent over the network.

SUMMARY

In one embodiment, a mobile device includes a transmitter configured to send a first message having a first message segment to a response network, and processing circuitry configured to receive a request to send a second message with a second message segment to the response network. Further, the processing circuitry is configured to send the second message as a redundant bit based on an entropy factor indicating a similarity of the second message with respect to the first message In another embodiment, a method for communication using a mobile device that includes receiving, at processing circuitry of the mobile device, a request to send a first message and dividing the first message into multiple information segments. Further the method includes sending, via the transmitter of the mobile device, the first message and receiving, at the processing circuitry, a request to send a second message. Additionally, the method includes determining, via the processing circuitry that the second message includes one or more information segments of the multiple information segments of the first message, and sending, via the transmitter, the one or more information segments of the second message as one or more redundant bits that indicate that the one or more information segments of the second message repeat the one or more information segments of the first message.

In yet another embodiment, a mobile device includes a transmitter configured to send one or more messages to a network and processing circuitry that is configured to receive a request to send a message to a response network, the message having a first message segment and a second message segment. Further, the processing circuitry is configured to determine the first message segment corresponds to a previously sent message segment, and send the first message segment as a redundant bit to the response network and send the second message segment to the response network.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

DETAILED DESCRIPTION OF SPECIFIC EMBODIMENTS

This disclosure is directed to optimizing or improving wireless communications via a mobile device based on network conditions and message content. By way of example, a mobile device may communicate high priority information to an incident response provider (e.g., public-safety answering point (PSAP), call-center, emergency service provider) during an emergency event (e.g., injury, flood, earthquake, fire). During the emergency event, a user of the mobile device may send multiple redundant messages to the response provider utilizing a communication system (e.g., including base stations, terrestrial stations, satellites or satellite networks (such as low earth orbit satellites, medium earth orbit satellites, geosynchronous equatorial orbit satellites, high earth orbit satellites), cellular networks, a wireless carrier, Wi-Fi networks, and so forth). For example, the mobile device, which may be implemented as user equipment, may send a signal to one or more components of a communication system, which may be implemented as one or more satellites. The multiple redundant messages sent by the mobile device to the response provider may result in network congestion. In addition, the communication system may operate with limited resources, such as limited link budget, battery capacity, bandwidth, data rate, and so forth. The limited resources of the communication system may result in delays in the response provider receiving and/or sending important information pertaining to emergency services. For instance, a user of the mobile device may send one or more redundant messages, followed by one or more relevant information messages. The communication system may forward or transmit the redundant messages sent first, and may delay the forwarding or transmission of further messages which may contain new or relevant information, while the first one or more redundant messages are sent to the response provider. This may lead to delays in responding to the mobile device user during emergency situations.

In some circumstances, during an environmental event (e.g., earthquake, hurricane, tornado), multiple mobile device users within a geographical area may send multiple redundant messages using the same communication system. This may result in further network congestion, as redundant messages containing the same or similar information sent from multiple mobile device may be received by the response provider. The influx of redundant messages may also lead to delays in the response provider receiving new or important information messages, providing incident response services, and so on. For example, during an environment event, multiple users may report the environmental event to the response provider, but may not request resources or aid. However, a user that is attempting to send a request for aid from their mobile device may have their request delayed due to the response provider receiving these other reporting messages first.

Further, mobile device conditions may result in messages intended to be transmitted being delayed or prevented from being transmitted altogether during emergency events. For example, if a mobile device is trending towards overheating and/or close to exceeding a low battery level, the mobile device may shutoff or deactivate, and the communication system may not be able to provide resources to the mobile device message. Additionally, environmental factors such as foliage level and weather may impact the network connection of the mobile device. These environmental factors may lead to an unreliable connection to the network, and mobile device transmissions may not be received by the response provider as a result of the unreliable network connection.

Embodiments herein provide various apparatuses and techniques to enable the mobile communication device to optimize or improve wireless communications in limited resource conditions. For example, the mobile device may prioritize new information messages (e.g., messages having new, as opposed to redundant, information) and minimize or decrease the number of redundant messages that are sent by the mobile device. This may enable the mobile device to save device and network resources. Indeed, the mobile communication device may determine that certain messages include the same or similar content as previous messages or content (e.g., with the same or similar meaning as a previous message). The mobile device may then send a redundant bit and information corresponding to one or more segments of the previous messages that have been sent. The mobile device may also determine an entropy factor that indicates relatedness or similarity of messages sent by the mobile device, and evaluate the determined entropy factor relative to a resource factor associated with network resources. This may enable the mobile device to prioritize sending new information messages over redundant messages based on network conditions.

Further, in some environments (e.g., when hiking, camping, hunting, fishing, and so on), obstructions, such as a forest canopy or foliage, may decrease signal quality (e.g., attenuate a signal transmitted and/or received by the mobile communication device), impairing a link budget of the mobile communication device, sometimes to the point of blocking the signal. This may be particularly significant in emergency situations, such as when someone has injured themselves in the remote and/or wooded area. In these environments, the mobile device may break down messages into one or more smaller segments to attempt to send the message over the reduced network connection. The mobile device may also notify the network when it detects a low battery or thermal trend that may lead to a device shutoff. The network may then prioritize resources (e.g., prioritize uplink scheduling of mobile device, provide additional resources for large or increased message transmission) to enable the mobile device to transmit quickly transmit messages and/or transmit larger or increased messages, so that the mobile device may transmit messages before the device shutoff.

Figure 1:
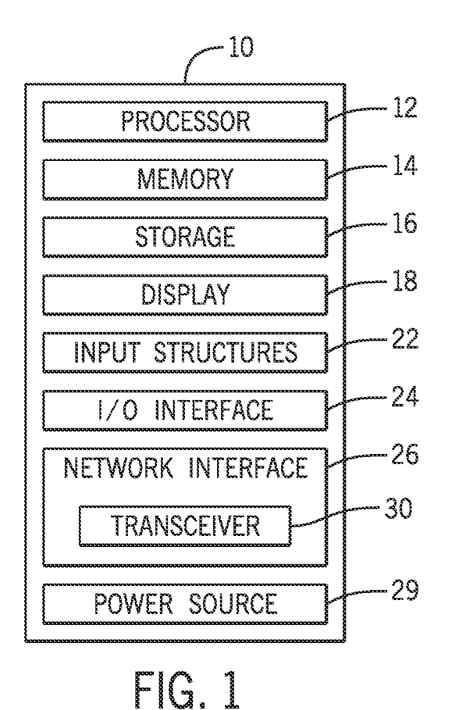
FIG. 1 is a block diagram of an electronic device, according to embodiments of the present disclosure.

With the foregoing in mind, FIG. 1 is a block diagram of the electronic device 10 or mobile communication device, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, the memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in a electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be generally referred to herein as "data processing circuitry." Such data processing circuitry may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol.

The network interface 26 may include, for example, one or more interfaces for a satellite connection (e.g., via a satellite network), a peer-to-peer connection, a personal area network (PAN), such as an ultra-wideband (UWB) or a BLUETOOTH® network, for a local area network (LAN) or wireless local area network (WLAN), such as a network employing one of the IEEE 802.11x family of protocols (e.g., WI-FI®), and/or for a wide area network (WAN), such as any standards related to the Third Generation Partnership Project (3GPP), including, for example, a $3^{rd}$ generation (3G) cellular network, universal mobile telecommunication system (UMTS), $4^{th}$ generation (4G) cellular network, long term evolution (LTE®) cellular network, long term evolution license assisted access (LTE-LAA) cellular network, $5^{th}$ generation (5G) cellular network, and/or New Radio (NR) cellular network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)). The network interface 26 of the electronic device 10 may allow communication over the aforementioned networks (e.g., 5G, Wi-Fi, LTE-LAA, and so forth). The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, UWB network, alternating current (AC) power lines, and so forth. The network interface 26 may, for instance, include a transceiver 30 for communicating data using one of the aforementioned networks. The power source 29 of the electronic device 10 may include any suitable source of power, such as a rechargeable lithium polymer (Li-poly) battery and/or an alternating current (AC) power converter.

Figure 2:
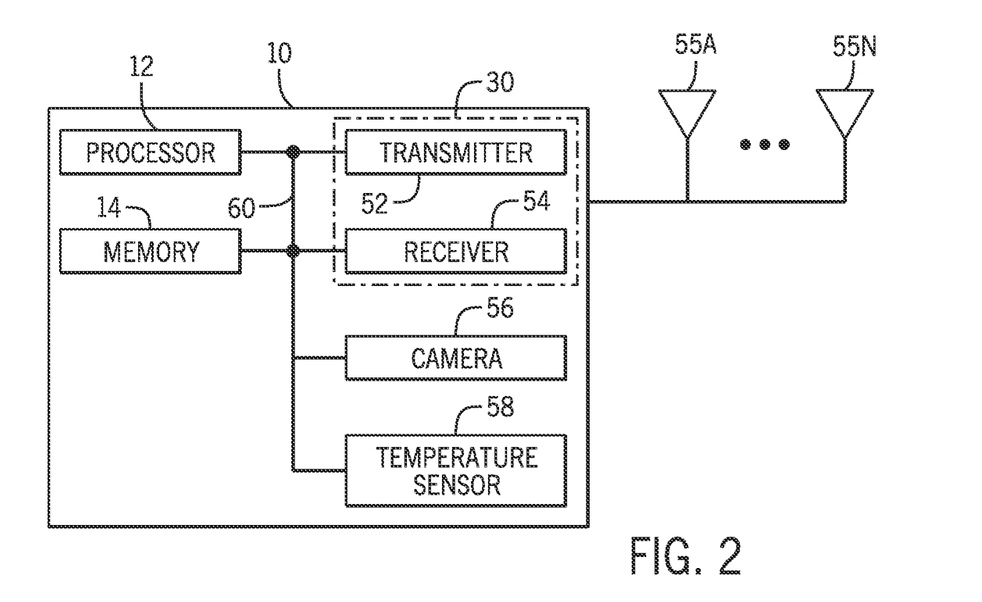
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. For example, the electronic device 10 may include a first transceiver to send and receive messages using a first wireless communication network, a second transceiver to send and receive messages using a second wireless communication network, and a third transceiver to send and receive messages using a third wireless communication network, though any or all of these transceivers may be combined in a single transceiver. In some embodiments, the transmitter 52 and the receiver 54 may transmit and receive information via other wired or wireline systems or means.

The electronic device 10 may also include one or more cameras or image or light sensors (e.g., as part of the input structures 22). The one or more cameras or image or light sensors (collectively referred to as "a camera 56" herein) may capture images or determine amounts of light surrounding the electronic device 10, and may determine a foliage level at a location of the electronic device 10. In some embodiments, the camera 56 may include a front-facing camera (e.g., disposed on a display surface of the electronic device 10 having the display 18) and/or a rear-facing camera (e.g., disposed on a base or back surface, opposite the display surface, of the electronic device 10).

The electronic device 10 may include one or more temperature sensors 58 (e.g., as part of the input structures 22). The one or more temperature sensors (collectively referred to as "a temperature sensor 58" herein) may include any suitable temperature sensor that may determine or facilitate determining a temperature of the electronic device 10, an ambient temperature of surroundings of the electronic device 10, or sense temperature values or ambient temperature values of surroundings of the electronic device 10 over time.

As illustrated, the various components of the electronic device 10 may be coupled together by a bus system 60. The bus system 60 may include a data bus, for example, as well as a power bus, a control signal bus, and a status signal bus, in addition to the data bus. The components of the electronic device 10 may be coupled together or accept or provide inputs to each other using some other mechanism.

As discussed above, the electronic device 10 may communicate in limited resource conditions (e.g., limited mobile device and network resources). Embodiments herein provide various apparatuses and techniques to optimize or improve communication based on network conditions and message content of mobile device messages. As an example, the electronic device 10 may determine when one or more redundant messages are requested to be sent. As used herein, the term "redundant" may mean a requested message contains a repeated segment of text from a previously sent message and/or contains a segment of text that relays the same information as a previously sent message. The electronic device 10 may determine the one or more redundant messages by determining an entropy factor that determines a relative complexity or similarity of each message to a previously sent message. The electronic device 10 may then send a redundant bit in place of a repeated message segment to the network along with information pertaining to the segments of the message that contain the repeated information. In this way, the electronic device 10 may prioritize transmission of new (e.g., non-redundant) information during high priority situations (e.g., emergency situations, environmental events). As a result, the electronic device 10 may communicate prioritized data more reliably and efficiently to a network.

In some embodiments, the electronic device 10 may communicate to the network that the device is trending towards a low battery or high temperature state. The network may then prioritize network resources to enable the electronic device 10 to send messages (e.g., requested or queued messages) before device conditions cause the electronic device 10 to shutoff or deactivate. The electronic device 10 may also break down or split one or more messages into smaller segments based on network conditions to communicate the one or more messages efficiently over the network. Further, obstructions, such as a forest canopy or foliage, may decrease signal quality (e.g., attenuate a signal transmitted and/or received by the mobile communication device). This may be particularly significant in emergency situations, such as when someone has injured themselves in the remote and/or wooded area, but the mobile communication device cannot communicate to request assistance due to heavy foliage. The electronic device 10 may determine the foliage level and break down or split one or more messages into smaller segments to transmit over the network, based on the foliage level. As a result, the electronic device 10 may transmit messages more efficiently during decreased signal quality conditions.

Figure 3:
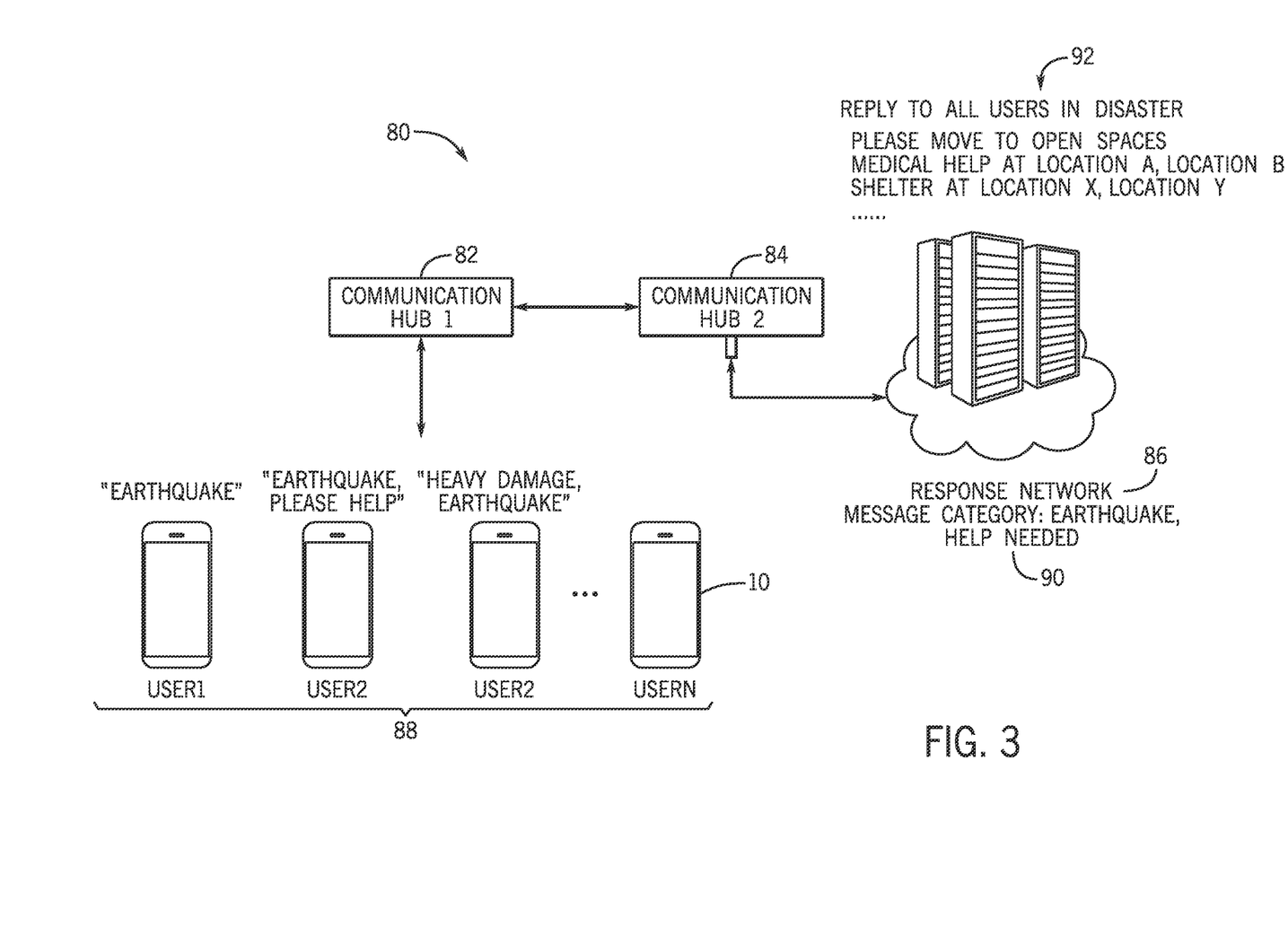
FIG. 3 is a perspective diagram of a communication system including the electronic device of FIG. 1, according to embodiments of the present disclosure.

With the preceding in mind, FIG. 3 is a perspective diagram of a communication system 80 including one or more electronic devices 10, according to embodiments of the present disclosure. The communication system 80 includes one or more electronic devices 10, a first communication hub 82, a second communication hub 84, and a response network 86. Each of the first communication hub 82 and the second communication hub 84 may be a part of a respective network for communicating data (e.g., a cellular network, a local network, the Internet, a non-terrestrial network, satellite network, another electronic device, and so on). As illustrated, the one or more electronic devices 10 may attempt to communicate (e.g., send and/or receive data) with the first communication hub 82. For example, the first communication hub 82 may establish a communication channel with the electronic device 10, receive requests for data from the electronic device 10, and send data to the electronic device 10 based on the requests. The first communication hub 82 and the second communication hub 84 may include any device or system that may be in communication with the one or more electronic devices 10 (e.g., a base station, a router, another electronic device 10, a high altitude base station, a satellite, a ground station, and so on). For example, the electronic device 10, which may be implemented as user equipment, may send a signal to the communication hub 82, which may be implemented as a satellite.

In certain embodiments, the first communication hub 82 may receive signals from one or more electronic devices 10 during an emergency situation (e.g., flooding, earthquake, tornado). The one or electronic devices 10 may request to send information to a response network 86 (e.g., emergency provider) during the emergency situation. The one or more electronic devices 10 may send messages having the same or similar information to the response network 86 during the emergency situation. The one or more messages 88 may be sent to the first communication hub 82 that receives the messages from the one or more electronic devices 10 via one or more established communication channel with the one or more electronic devices 10. The first communication hub 82 may then send the one or more messages 88 to a second communication hub 84 that may communicate with the response network 86. It should be understood that any suitable number of communication hubs (e.g., 82, 84) may be used to communicate the one or more messages 88 sent by the electronic devices 10 to the response network 86. The number of communication hubs (e.g., 82, 84) used to transmit the messages may be based on geographical locations of the electronic devices 10 and/or the response network 86, network connections affected by the emergency event, and any other suitable network considerations.

As discussed above, in some embodiments, one or more messages 88 sent by the electronic devices 10 may contain redundant (e.g., repeated or related) information. The one or more redundant messages may be sent to the first communication hub 82, and may cause network congestion to and/or from the first communication hub 82 due to a large volume of messages being received by the first communication hub 82. This may lead to delays in the first communication hub 82 receiving the one or more messages 88 and transmitting the one or more messages 88 to the second communication hub 84. This may, in turn, create a bottleneck effect, and delay the transmission of the one or more messages 88 from the second communication hub 84 to the response network 86. For example, one or more electronic devices 10 may send one or more messages 88 having information related to reporting a fire in a certain geographical area, though the one or more messages 88 may contain no new or pertinent information relating to the disaster. This may result in network congestion, and the response network 86 may not be able to respond to new information messages due to delays caused by receiving the one or more redundant messages sent by the electronic devices 10 of the communication system 80. This may lead to an electronic device 10 receiving a delayed response from emergency providers associated with the response network 86.

The response network 86 may also experience delays in attempting to respond to the one or more messages 88 individually. To reduce delays, the response network 86 may tag messages that contain the same or similar information into categories 90. For example, the one or more electronic devices 10 may send one or more messages 88 to the response network 86 that relate to requests for assistance as a result of an earthquake. The response network 86 may recognize the one or more messages 88 may be related to an "earthquake, help needed" category 90. The response network 86 may then transmit a message replying to the electronic devices 10 that sent the one or more messages 88 corresponding to the earthquake help needed category 90. The response message may include response instructions 92 (e.g., move to open spaces, medical help locations, shelter locations) and may be sent to the electronic devices 10 tagged in the "earthquake, help needed" 90 category, to reduce transmission delays and backlogs resulting from the response network 86 responding to each electronic device 10 message individually.

Further, the response network 86 may categorize information segments of each received message and group related information segments based on a determined relatedness or entropy factor (e.g., similarity and/or relative complexity of a received message to previously received messages) of received messages. The information segments correspond to portions of text within a message that convey new information and/or relevant information. It should be understood that the information segments may contain different text or shortened text relative to the previously received message, but relay the same information as the text segments of the previously received message. The one or more electronic devices 10 may also reduce individual transmission of redundant messages to the first communication hub 82. To do this, the electronic devices 10 may determine an entropy factor (e.g., that determines a relatedness or relative complexity of the message requested to be sent to previously sent messages) for each message. The electronic devices 10 may then transmit a redundant bit and information corresponding to one or more segments of the previous message that have been sent, in the place of the redundant message to reduce network congestion as a result of transmitting redundant messages during an emergency event.

Figure 4:
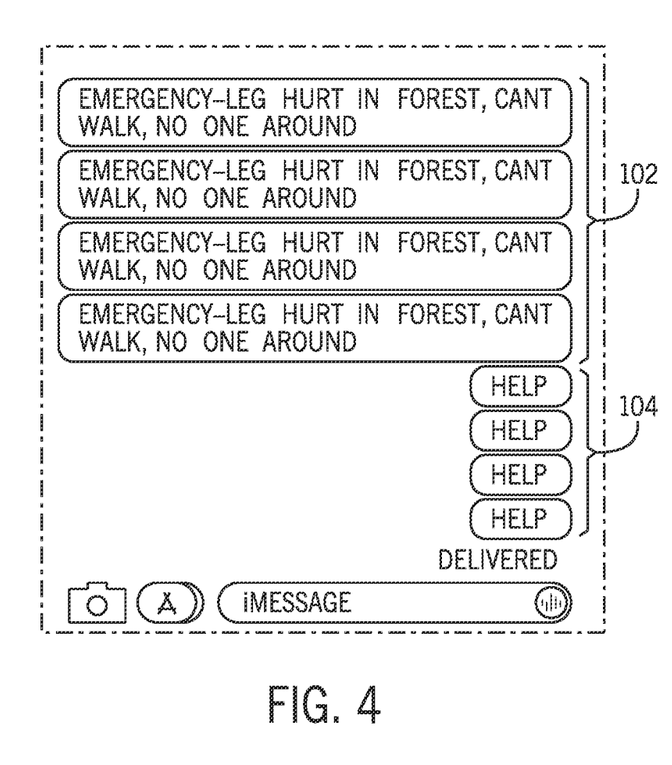
FIG. 4 is a first set of redundant messages displayed on an interface of the electronic device of FIG. 1, according to embodiments of the present disclosure.

With the foregoing in mind, FIG. 4 is a first set of redundant messages displayed on an interface (e.g., a user interface) of the electronic device of FIG. 1, according to embodiments of the present disclosure. The electronic device 10 may request to send one or more redundant messages over a network during an emergency event. The one or more messages may be redundant with respect to previously sent messages (e.g., contain information similar to that of previously sent messages).

Network communication may be a limited resource (e.g., in terms of link budget, battery capacity, bandwidth, and data rate) during, for example, emergency events. During times of limited network resources, message transmission and/or reception over the network may be delayed. In certain emergency events, information may be prioritized, so that high priority information is transmitted to a response provider over a network and the response provider may respond in a timely manner. High priority information may correspond to data transmissions relating to new information that the user has not previously sent to the response provider. In emergency events, users may end up sending the same message multiple times to response providers, or send similar messages that contain no new information. This may result in network congestion and delays in communication to and from the response provider (e.g., via the response network 86). For example, a user may be hurt in a forest and may attempt to request help from a response provider. The user may first request to send a message 102 via the electronic device 10 that contains the text "Emergency—leg hurt in forest, cant walk, no one around". The user may send the same message 102 four or more times. The response provider may only need to receive the message 102 once, since the other three or more messages are redundant (e.g., repeats) of the previous message 102, and contain no new information for the response provider to utilize. The user may then send an additional message 104 containing the text "help". The user may then request to send the same message 104 three or more times. The response provider may only need to receive the request for help once to provide aid, as the other help requests are redundant and may result in delays in the response provider receiving more pertinent information that the user may attempt to send after the redundant messages 104.

The electronic device 10 may determine that redundant messages are requested to be sent, and may only send one of each of the messages 102, 104 relating to the emergency and one of the messages relating to a help request. The electronic device 10 may transmit one or more redundant bits and information corresponding to repeated segments of the redundant messages for every redundant message request detected by the electronic device 10. This may enable the network to transmit the messages at a more rapid speed, and enable the response provider to respond to the electronic device 10 and provide information to the user of the electronic device 10 more efficiently.

Figure 5:
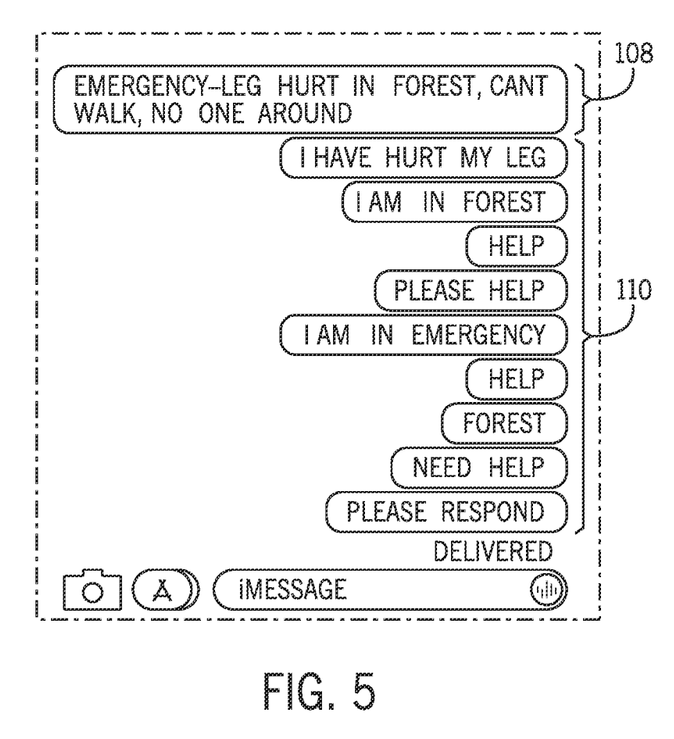
FIG. 5 is a second set of redundant messages displayed on the interface of the electronic device of FIG. 1, according to embodiments of the present disclosure.

With the foregoing in mind, FIG. 5 is a second set of redundant messages displayed on the interface of the electronic device of FIG. 1, according to embodiments of the present disclosure. The user may request to send one or more messages that may be different in terms of language used or wording, but may relate to the same or similar information sent in a previous message. The messages may contribute to redundant messages being sent over the network, which may cause network congestion and delay transmission of new information messages.

For example, a user may be hurt in a forest and may be attempting to request help from an emergency provider. The user may first request to send a message 108 via the electronic device 10 that contains the text "Emergency—leg hurt in forest, cant walk, no one around". The user may then request to send multiple redundant messages 110 that include redundant (e.g., repeated or related) information sent in the previous message 110.

The additional redundant messages 110 may not be exact repeats of the previous message 108, but the redundant messages 110 may correspond to repeated information segments of the previous message 108. For example, one of the redundant messages 110 may provide information that contains the text "Forest" that has been provided in the previous message 108. The electronic device 10 may determine that the redundant messages 110 contain the same or similar meaning or repeated information segments of the previous message 108, and therefore may send redundant bits for the additional redundant messages 110, as they do not provide new or relevant information to the response provider. This process may reduce network congestion and aid in transmission and/or reception of relevant information to the response provider.

Figure 6:
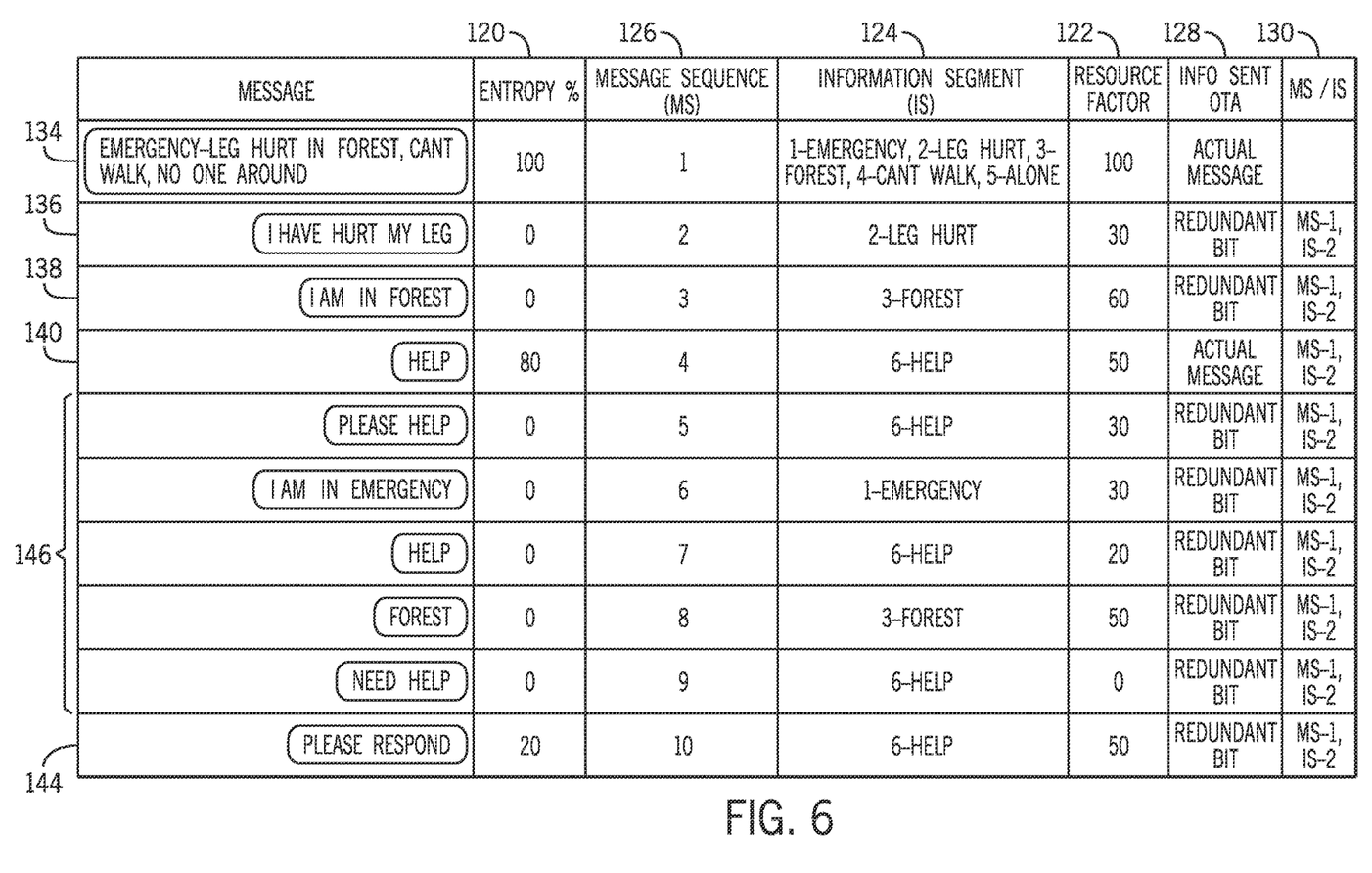
FIG. 6 is a schematic diagram of characteristics of the redundant messages of FIG. 5 based on network resources, according to embodiments of the present disclosure.

With the foregoing in mind, FIG. 6 is a schematic diagram of characteristics of the redundant messages of FIG. 5 based on network resources, according to embodiments of the present disclosure. The electronic device 10 may determine an entropy factor 120 corresponding to the relative complexity or similarity of messages requested to be sent by the user of the electronic device 10 to previously sent messages from the electronic device 10, and determine whether the messages are redundant based on the entropy factor 120. The electronic device 10 may then determine, based on the determined entropy factor 120 of a requested message and a resource factor 122 corresponding to network and electronic device resources, if the requested message should be sent as an actual, complete, or full message or as a redundant bit along with information related to the repeated segments of the message (e.g., a compressed version of the requested message).

In emergency situations (e.g., injury, earthquake, fire, flooding), a user of the electronic device 10 may request to send one or more redundant messages that contain the same or similar information. This may cause excessive usage of communication system resources of the network, and may lead to network congestion. This may result in delay of high priority (e.g., new or relevant) information being received by a response provider (e.g., response network 86, 911 callcenter, emergency provider). To mitigate delays in transmitting and/or receiving high priority information, the electronic device 10 may assign an entropy factor 120 to each message requested to be sent (e.g., during an emergency session, during message requests to a response provider, and the like). The entropy factor 120 may correspond to a relatedness or amount of repeated meaning of successive messages. For example, an initial message 134 may correspond to an entropy of 100% and the processor 12 of the electronic device 10 may determine (e.g., using a machine-learning algorithm) the entropy of successive messages (e.g., compared to the initial message 134 and/or other previous messages) that are requested to be sent by the user of the electronic device 10. The electronic device 10 may set a threshold entropy level to determine whether the full message content is to be transmitted over the network to the response provider. If the electronic device 10 determines that the entropy factor 120 is below the threshold level, the electronic device 10 may send a redundant bit along with information related to the repeated segments of the message over the network to the response provider. This may result in decreased network congestion and the response provider receiving new and relevant information pertaining to the emergency situation.

The electronic device 10 may also determine a resource factor 122 in addition to the determined entropy factor 120 for each successive message to determine if the actual message is sent to the network, or if a redundant bit and information related to the repeated segments of the message is sent to the network. The resource factor 122 for each message may be determined based on the congestion level of the network, the battery level of the electronic device 10, the link budget of the network, the thermal level of the network, or any combination thereof, and so on. The resource factor 122 may be determined by weighting certain factors based on the significance of the factors. For example, the battery level may be weighted higher in determining the resource factor 122 depending on if the battery level is below a certain threshold value. That is, if the battery level is below 50%, the battery level may be weighted higher in the resource factor 122 calculation. It should be understood, that any combination of resource factors relating to network resources and electronic device resources may be implemented when determining the resource factor 122 for each message sent. Further, each factor may contribute varying percentages to the overall resource factor based on the significance determined for each factor. The resource factor 122 may also vary from message to message due to the immediate network resources and the immediate electronic device resources. For example, if the congestion level of the network decreases from one message to another message, then the resource factor 122 may decrease, and thus may not be weighted as heavily when the electronic device 10 is determining whether to send the message based on the resource factor 122 and entropy factor 120.

Further, the electronic device 10 may determine whether to send the message based on the entropy factor 120 meeting or exceeding the resource factor 122 determined for each message. For example, a first message 134 in a message sequence 126 (e.g., first message sent during the emergency session) may correspond to an initial entropy factor 120 of 100%. The initial resource factor 122 may be 100% due to a high network congestion level and/or high battery level, or any other resource consideration. Based on the entropy factor 120 meeting or exceeding the determined resource factor 122, the electronic device 10 may send the actual message as the information sent over the air (OTA) 128 to the network.

Additionally, the electronic device 10 may tag or identify the first message 134 as a first message in a message sequence 126, during the emergency session. The first message 134 may also be broken down, separated, divided, or split into information segments 130 (e.g., segments of the messages that relay new information) that are tagged or identified and sent to the response provider so that the response provider may associate future message segments sent to the provider with segments of the initial message sent. For example, the first message 134 sent by the electronic device 10 may be "Emergency—leg hurt in forest, can't walk, no one around." The electronic device 10 may include a processor 12 that determines (e.g., using a machine-learning algorithm) new or relevant information segments 124 within the message, and determines an entropy factor 120 of the message relative to previous messages sent. The processor 12 may determine that the message has a first information segment 124 corresponding to "emergency," a second information segment 124 corresponding to "leg hurt," a third information segment 124 corresponding to "forest," a fourth information segment 124 corresponding to "can't walk," and a fifth information segment 124 corresponding to "alone." The processor 12 may store the five information segments 124 in a database (e.g., in the memory 14 and/or the storage 16) accessible by the electronic device 10. The processor 12 may send the five information segments 124 along with the actual message to the response provider. Further, the processor 12 may save the information segments 124 to the database, the memory 14, and/or the storage 16 to enable a redundant bit to be sent with an information segment 124 tag if future messages are redundant with respect to a meaning of a previous message based on, in some embodiments, the determined entropy factor 120 for the future message being below the resource factor 122 of the message.

For example, the second message 136 requested to be sent may contain the text "I have hurt my leg," and the processor 12 may determine the entropy factor 120 for this message to be 0% due to the message repeating the second information segment 124 of the first message 134. As discussed above, the processor 12 may determine the entropy factor 120 based on using a machine-learning algorithm and comparing words and context of previous messages to a current message request. The second message 136 may then send the information OTA to the network 128 as a redundant bit, along with information specifying the message sequence 126 that the second message is repeating, which is at least a portion of the first message 134 in the sequence. For example, the electronic device 10 may send a redundant bit along with "MS-1, IS-2" to the network to signify the message sequence and information segment (MS/IS) 130 the second message 136 repeats from the previously sent first message 134. In particular, MS-1 may refer to "message 1" (e.g., the first message 134), and IS-2 may refer to "information segment 2" (e.g., the second information segment of the first message 134, or "leg hurt"). The message sequence 126 and information segment 124 information may be utilized by the response provider to analyze important repeated segments of a previously sent message, and enable the response provider to categorize multiple messages from different users according to information segments as described above in FIG. 3.

The electronic device 10 may continue to determine the entropy factor 120 and resource factor 122 of successive messages sent. For example, a third message 138 sent to the network may contain the text "I am in the forest", and the electronic device 10 may determine the entropy factor 120 corresponding to the message as 0%, and send a redundant bit and the message sequence MS/IS 130 corresponding to the first message 134. The repeated information segment 124, in the case of the third message 138, would be "IS-3" corresponding to the third information segment of the first message 134, or "forest." The resource factor 122 corresponding to the second message may increase to 60 due to network congestion increasing, link budget decreasing, electronic device 10 battery level decreasing, or the like.

The fourth message 140 requested to be sent may contain the text "help," and may correspond to an entropy factor 120 of 80%, which may be higher than the resource factor 122 of 50 calculated at the time of the fourth message request 140. The actual message may then be the information sent OTA 128 to the response provider. The proceeding five through nine messages 146 requested to be sent may each correspond to previous segments of the first message 134 and the fourth message 140. Each of the fifth through ninth messages 146 may have a determined entropy factor 120 of zero due to the repeated segments of the previous messages, and therefore the messages 146 may each be sent as a redundant bit along with the MS/IS 130 information of each message.

In some embodiments, the message request may be different from previously sent messages, but still may not add any new or relevant information. For example, the tenth message 144 requested to be sent may contain the text "please respond," and may not add any additional information that would aid the response provider in determining an appropriate response to the user's situation. The processor 12 (e.g., via the machine-learning algorithm) may determine that the tenth message 144 does not add any new or relevant information, and may assign a low entropy factor 120. The low entropy factor 120 may be less than the determined resource factor 122, and the message may be sent as a redundant bit and information that corresponds to the repeated segments of the previous message. The message 144 may be also mapped to the "help" message previously sent in the fourth message 4, and the MS/IS 130 sent to the response provider may correspond to this previous message along with the redundant bit sent. It should be understood that the calculation of the entropy factor 120 may depend on a variety of syntax and historical factors implemented by the machine learning algorithms. The entropy factor 120 and resource factor 122 may be applied to successive messages sent out during an emergency session, in which the user of the electronic device 10 is attempting to communicate with the resource provider.

Figure 7:
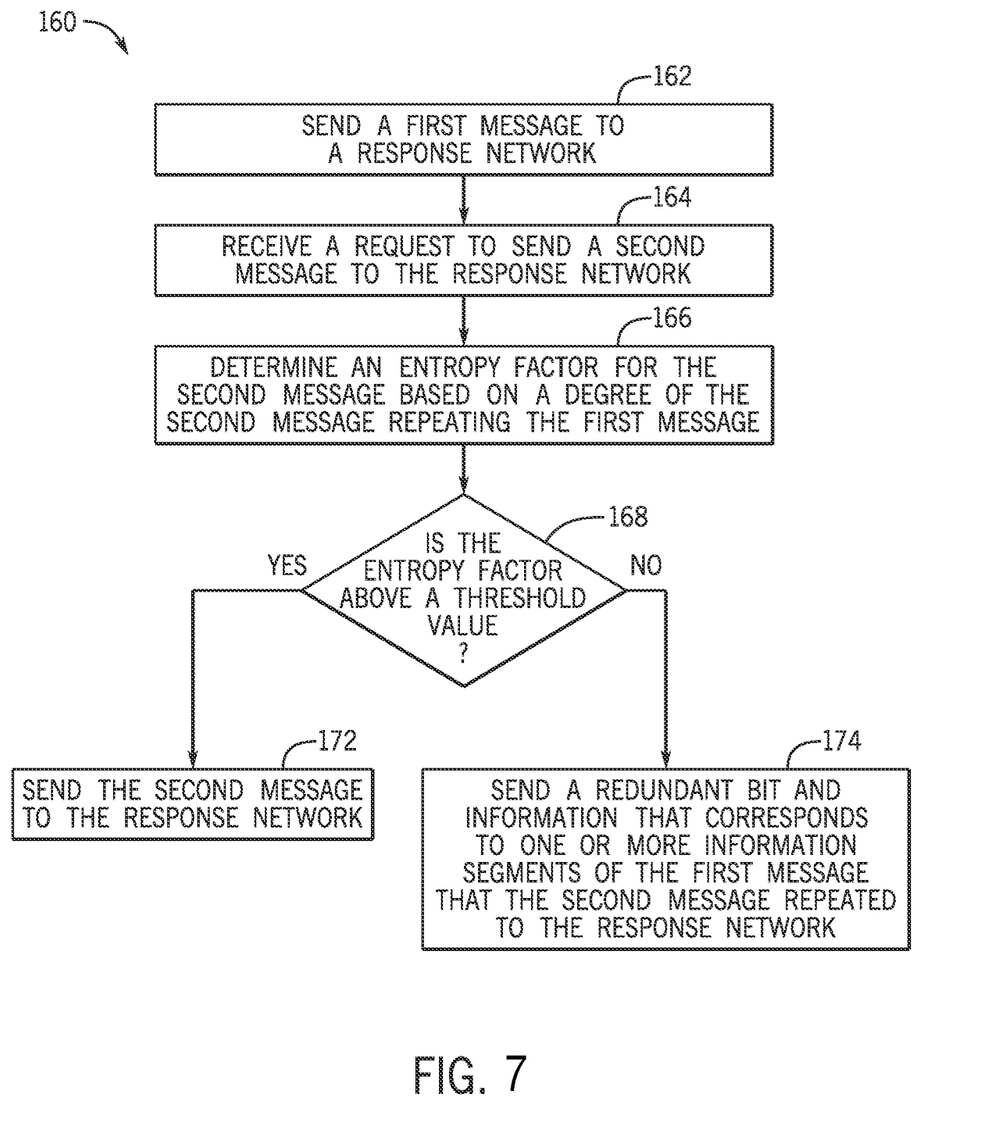
FIG. 7 is a flowchart of a method for efficient communication based on the characteristics of the redundant messages of FIG. 6, according to embodiments of the present disclosure.

With the foregoing in mind, FIG. 7 is a flowchart of a method 160 for efficient data communication based on the characteristics of the redundant messages of FIG. 6, according to embodiments of the present disclosure. The electronic device 10 may send one or more redundant messages to a response network 86 during an emergency event. The electronic device 10 may determine when a message requested to be sent is a redundant message, and may send a redundant bit and information that corresponds to the repeated segments of the previous message to the response network 86. Any suitable device (e.g., a controller) that may control components of the electronic device 10, such as the processor 12, may perform the method 160. In some embodiments, the method 160 may be implemented by executing instructions stored in a tangible, non-transitory, computer-readable medium, such as the memory 14 or storage 16, using the processor 12. For example, the method 160 may be performed at least in part by one or more software components, such as an operating system of the electronic device 10, one or more software applications of the electronic device 10, and the like. While the method 160 is described using steps in a specific sequence, it should be understood that the present disclosure contemplates that the described steps may be performed in different sequences than the sequence illustrated, and certain described steps may be skipped or not performed altogether.

In process block 162, the processor 12 causes the transmitter 52 to transmit a first message to the response network 86 during an emergency session (e.g., a message session between the electronic device 10 and the response network 86). The first message may include information pertaining to the emergency (e.g., a location of the electronic device 10, a request for help, details of emergency, and so on), or any other information the electronic device 10 is configured to convey to the response network 86. The processor 12 may also store the first message text content to the memory 14 of the electronic device 10 in response to causing the transmitter 52 to transmit the first message to the response network 86.

In process block 164, the processor 12 may determine a request to send a second message to the response network 86. The second message may be requested by a user of the electronic device 10, and the request may be made at any time after the first message has been sent. The second message content may be similar to the content of the first message and/or may contain new information relative to the content of the first message. In response to receiving the request to send the second message, the processor 12, at process block 166, determines (e.g., using a machine-learning algorithm) an entropy factor 120 that relates to a degree of redundant information in the second message relative to the first message. The entropy factor 120 may be determined by determining an amount of text repeats, an amount of similar meaning text repeats, an amount of new information text contained in the second message relative to the first message text content, or any combination thereof, and so on.

After determining the entropy factor 120 for the second message, the processor 12, at decision block 168, determines if the entropy factor 120 for the second message exceeds a threshold value. The threshold value may be a pre-set threshold value or may be a dynamic threshold value set based on available device resources and/or network conditions (e.g., network congestion, battery level, link budget, bandwidth, data rate). If the processor 12 determines that the entropy factor 120 is above the threshold value, then the processor 12, at process block 172, causes the transmitter 52 to transmit the second message to the response network 86.

If the processor 12 determines that the entropy factor 120 of the second message is below the threshold value, then, at process block 174, the processor 12 causes the transmitter 52 to transmit a redundant bit in response to the second message content corresponding to repeated or redundant message content relative to the first sent message. The processor 12 may also send information that corresponds to the repeated segments of the first message present in the second message text. The information may include numerical tags corresponding to segments of the first message text that were repeated in the second message content. In this way, the response network 86 receives new information and relevant information pertaining to repeated information without the need to send repeated or redundant messages to the response network 86.

In some emergency situations, the electronic device 10 may be exposed to environmental conditions (e.g., heat, rain, cold, heavy foliage) that may affect an ability to communicate with the response network 86. In these situations, it may be beneficial for the electronic device 10 to determine environmental conditions that may impact the electronic device 10 network connections, and implement mitigation measures to ensure messages may be sent to the response network 86 during these conditions.

Figure 8:
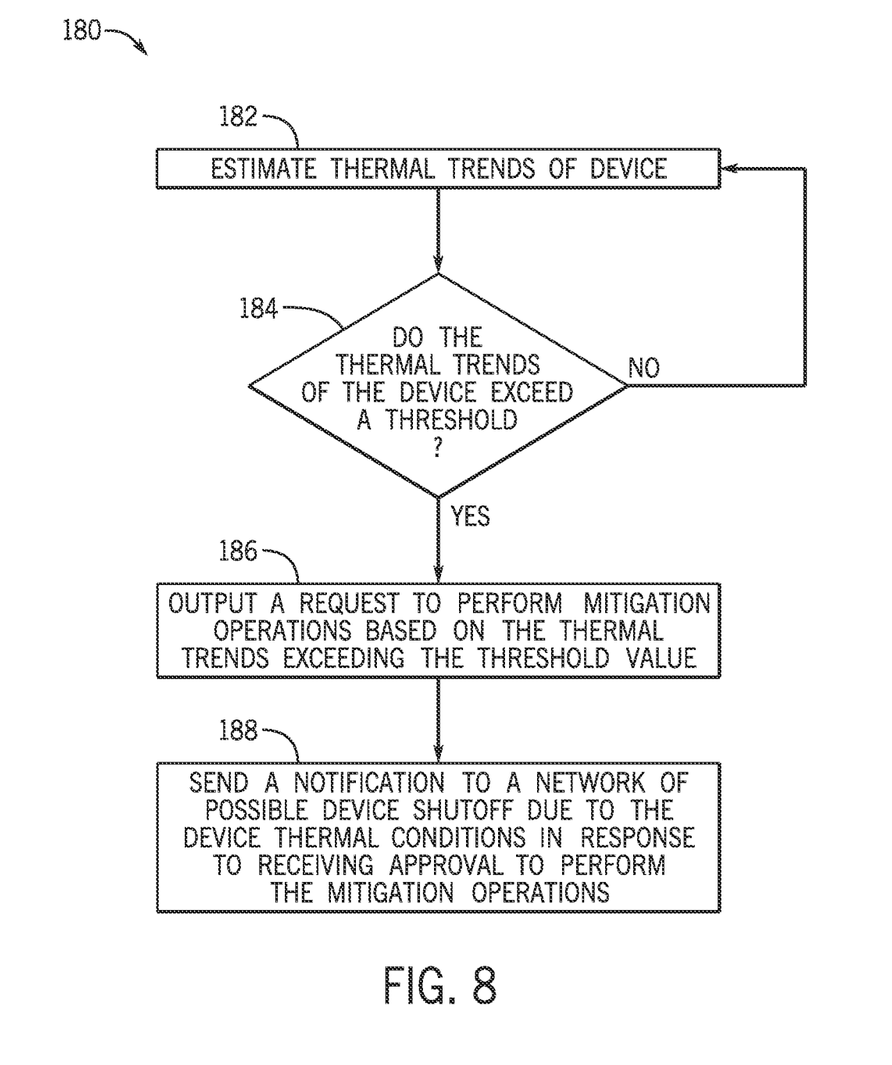
FIG. 8 is a flowchart of a method for efficient communication based on electronic device conditions, according to embodiments of the present disclosure.

With the foregoing in mind, FIG. 8 is a flowchart of a method 180 of efficient electronic device 10 communication based on the electronic device 10 conditions, according to embodiments of the present disclosure. Certain environmental condition and electronic device 10 conditions may result in a decreased or interrupted network connection for the electronic device 10. The electronic device 10 may monitor device conditions, and may implement measures to optimize data transmissions to the response network 86 based on the device conditions. Any suitable device (e.g., a controller) that may control components of the electronic device 10, such as the processor 12, may perform the method 180. In some embodiments, the method 180 may be implemented by executing instructions stored in a tangible, non-transitory, computer-readable medium, such as the memory 14 or storage 16, using the processor 12. For example, the method 180 may be performed at least in part by one or more software components, such as an operating system of the electronic device 10, one or more software applications of the electronic device 10, and the like. While the method 180 is described using steps in a specific sequence, it should be understood that the present disclosure contemplates that the described steps may be performed in different sequences than the sequence illustrated, and certain described steps may be skipped or not performed altogether.

In process block 182, the processor 12 estimates the thermal trends (e.g., if the device is increasing in temperature or decreasing in temperature) of the electronic device 10. The processor 12 may estimate the thermal trends using an on-device machine-learning algorithm. Over the electronic device 10 lifetime, the machine-learning algorithm may develop thermal trends based on electronic device 10 activity, application usage on the electronic device 10, the GPS location of the electronic device 10 (e.g., temperature trends at geographical locations), or the like. In some embodiments, the electronic device 10 may include a temperature sensor 58 that collects temperature data of the device over time. The machine-learning algorithm may then use the temperature data to determine the on-device thermal trends. The processor 12 may use these determined thermal trends to predict or determine conditions that may lead to a temperature trap (e.g., high heat (temperatures exceeding 95 degrees Fahrenheit) or low temperature conditions (temperatures below 32 degrees Fahrenheit) that lead to electronic device 10 shutoff or decreased network connection of the electronic device 10).

In decision block 184, the processor 12 determines based on the estimated thermal trends of the electronic device 10, if the thermal trends exceed a threshold. The threshold may correspond to a risk of electronic device 10 signal loss and/or degraded signal quality in regard to electronic device 10 messages transmitted to or received from the response network 86. In the case of low temperature conditions, the thermal trends may exceed the low temperature threshold if the device temperatures trend below a low temperature value (e.g., temperatures below 32 degrees Fahrenheit). Further, in the case of high temperature conditions, the thermal trends may exceed the high temperature threshold if the device temperatures trend above a high temperature value (e.g., temperatures exceeding 95 degrees Fahrenheit). If the processor 12 determines the thermal trends related to the electronic device 10 does not exceed the threshold, the method 180 returns to process block 182, and the processor 12 continues to estimate the thermal trends of the electronic device 10.

If the processor 12 determines that the thermal trends exceed the threshold, at process block 186, the processor 12 outputs (e.g., via the display 18 or another output device of the electronic device 10) a request to perform mitigation operations based on the electronic device 10 thermal trends exceeding the threshold value. In some embodiments, the mitigation operations may be implemented by default based on the device thermal trends, without the need to output the request to perform mitigation operations. The mitigation operations may include battery saving measures, entering a power saving mode, deactivating power-intensive components or processes, decreasing network operations (e.g., only performing emergency or prioritized network operations), sending a notification to a network, or any other suitable mitigation measures. In process block 188, the processor 12 sends a notification to the network of possible device shutoff or decreased signal quality due to the electronic device 10 thermal conditions exceeding the threshold value (e.g., in response to receiving approval to perform the mitigation operations). This may enable the network to prioritize the messages sent from the electronic device 10 so that messages may be sent before electronic device 10 prior to the shutdown or poorer device performance due to thermal conditions. The network and/or electronic device 10 may prioritize the messages by performing a battery saving measure, entering a power saving mode, deactivating power-intensive components or processes, decreasing network operations, prioritizing uplink scheduling of the device, providing additional resources for large or increased message transmission from the electronic device 10, or the like.

As discussed above, in some emergency situations, the electronic device 10 may be exposed to environmental conditions (e.g., heat, rain, cold, heavy foliage) that may affect the electronic device 10 ability to communicate with the response network 86. In these situations, it may be beneficial for the electronic device 10 to determine environmental conditions that may impact the electronic device 10 network connections, and implement mitigation measures to ensure messages may be sent to the response network 86.

Figure 9:
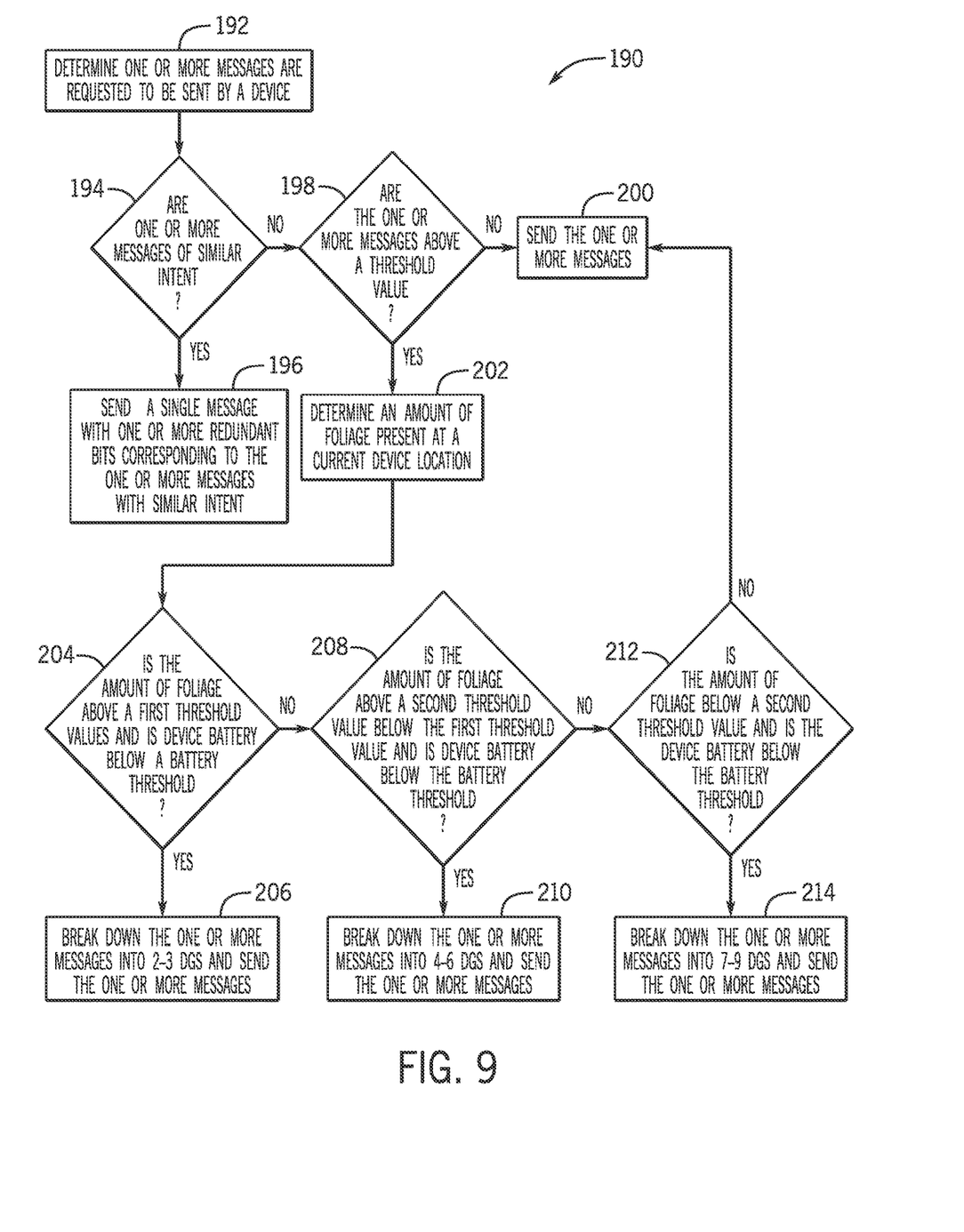
FIG. 9 is a flowchart of a method for efficient communication based on environmental conditions, according to embodiments of the present disclosure.

With the foregoing in mind, FIG. 9 is flowchart of a method 190 for efficient communication based on the environmental conditions, according to embodiments of the present disclosure. Certain environmental conditions and electronic device 10 conditions may result in a decreased or interrupted network connection of the electronic device 10 connection to the network. The electronic device 10 may monitor device conditions, determine certain changes in environmental conditions, and implement measures to improve transmission to and reception from the response network 86 based on the device conditions and environmental conditions. Any suitable device (e.g., a controller) that may control components of the electronic device 10, such as the processor 12, may perform the method 160. In some embodiments, the method 190 may be implemented by executing instructions stored in a tangible, non-transitory, computer-readable medium, such as the memory 14 or storage 16, using the processor 12. For example, the method 190 may be performed at least in part by one or more software components, such as an operating system of the electronic device 10, one or more software applications of the electronic device 10, and the like. While the method 190 is described using steps in a specific sequence, it should be understood that the present disclosure contemplates that the described steps may be performed in different sequences than the sequence illustrated, and certain described steps may be skipped or not performed altogether.

In process block 192, the processor 12 determines a request to send one or more messages from the electronic device 10 to the response network 86. The one or more messages may contain redundant information (e.g., same or similar meaning, same algorithm context information) or unique information relative to the subsequent messages sent. In decision block 194, the processor 12 determines if the one or more message contain similar intent to the other requested messages or previous messages sent. The processor 12 may determine similar intent messages by using a machine-learning algorithm to identify similar text or similar meaning text from the one or more messages. It should be understood that any suitable method may be used to determine similar intent.

If the processor 12 determines that the one or more messages contain a similar intent to the other messages or previously sent messages, then, in process block 196, the processor 12 may request to send a single message with text and one or more redundant bits corresponding to a number of messages with determined similar intent. For example, the first message of the one or more messages may be "Help in forest" and the next two messages of the one or more messages requested to be sent may be "Help" and "in forest". The processor 12 may recognize (e.g., via the machine-learning algorithm) that the three requested messages are of similar intent, and may then request to send the "Help in forest" message and send two redundant bits corresponding to the other two messages of determined similar intent. It should be understood that this process may be repeated regardless of the number of messages.

If the processor 12 determines that the one or more messages are not of similar intent, then, at decision block 198, the processor 12 determines if the one or more messages are above a threshold size (e.g., greater than 35 bytes). The threshold size may be set by the available bandwidth of the electronic device 10, or based on electronic device 10 resources and network resources. If the processor 12 determines that the one or more messages are below the threshold size, the processor 12, at process block 200, may transmit the one or more messages to the response network 86.

If the processor 12 determines that the one or more messages are above the threshold size, then, at process block 202, the processor 12 determines an amount of foliage present at a location of the electronic device 10. For example, the electronic device 10 may be disposed at a lower elevation (e.g., in a valley), the network hubs may be disposed at a higher elevation when compared to that of the electronic device 10 (e.g., on a cliff), and a forest canopy may be disposed in between the electronic device 10 and the network hubs, thus potentially obstructing a communication link between the electronic device 10 and the network. The greater amount or percentage of the sky covered by foliage (e.g., the greater the degree of obstruction), the greater the impairment on communication signals to and from the electronic device 10. A camera 56 of the electronic device 10 may capture one or more images (e.g., image data) of the foliage at the electronic device 10 location, and the processor 12 may determine a foliage level based on the one or more images captured by the camera 56. The processor 12 may also determine the foliage coverage level of the electronic device 10 by searching a database of foliage coverage based on the mobile device location. The processor 12 may categorize the amount of foliage present as "light foliage," "medium foliage," and "heavy foliage". The foliage categories may be relative, and may apply to any suitable amounts or percentages of foliage. As an example, light foliage may refer to when foliage covers between 0% and 33% of the sky as captured in an image, medium foliage may refer to when foliage covers between 34% and 66% of the sky as captured in an image, and heavy foliage may refer to when foliage covers between 67% and 100% of the sky as captured in an image. More or less coverage categories may be defined (e.g., "medium light foliage," "medium heavy foliage," and so on). It should be understood that any suitable foliage category may be used.

At decision block 204, the processor 12 determines if the amount of foliage is above a first threshold value and if the battery level is below a threshold value (e.g., 20%, 30%, 40%, 50%). The first threshold value may correspond to a heavy foliage level or a percent foliage that covers greater than or equal to 67% of the sky as captured in an image, or any other suitable metric indicative of heavy foliage coverage. If the processor 12 determines that the amount of foliage is above the first threshold value and the electronic device 10 battery level is below the battery threshold, then the processor 12, at process block 206, breaks down, separates, divides, or splits the one or more messages into portions having sizes of two to three datagrams and sends the one or more messages to the response network 86. The processor 12 may cause the transmitter 52 to send the portions that are two to three datagrams in size using a communication signal that has been degraded based on the heavy foliage level and/or the lower battery level to increase a likelihood that at least some of the content of the one or more messages may be received by the response network 86.

If the processor 12 determines that the amount of foliage is below the first threshold and/or the battery is not below a battery threshold, then, at decision block 208, the processor 12 determines if the amount of foliage is above a second threshold value below the first threshold value and if the battery level is below a threshold value (e.g., 20%, 30%, 40% 50%). The second threshold value may correspond to a medium foliage level or a percent foliage that covers greater than 34% of the sky as captured by an image, or any other suitable metric indicative of medium foliage coverage. If the processor 12 determines that the amount of foliage is above the second threshold value, and the electronic device 10 battery level is below the battery threshold, then the processor 12, at process block 210, breaks down the one or more messages into portions having a size of four to six datagrams and sends the one or more messages to the response network 86. The processor 12 may cause the transmitter 52 to send the portions that are four to six datagrams in size using a communication signal that has been degraded based on the medium foliage level and/or the lower battery level to increase a likelihood that at least some of the one or more message content may be received by the response network 86.

If the processor 12 determines that the amount of foliage is below a second threshold and/or the battery is not below a battery threshold, then, at decision block 212, the processor 12 may determine if the amount of foliage is below the second threshold value, and if the battery level is below a threshold value (e.g., 20%, 30%, 40%, 50%). If the processor 12 determines the amount of foliage is below the second threshold value and the electronic device 10 battery level is below the battery threshold the processor 12, then, at process block 214, the processor 12 may break down the one or more messages into portions having a size of seven to nine datagrams and send the one or more messages. The processor 12 may cause the transmitter 52 to send the portions that are four to six datagrams in size using a communication signal that has been degraded based on a light foliage level (e.g., less than the medium foliage level) and/or the lower battery level to increase a likelihood that at least some of the one or more message content may be received by the response network 86. If the processor 12 determines that the battery is not below a battery threshold, then at process block 200, the processor 12 causes the transmitter 52 to send the one or more messages to the response network 86. In this way, the processor 12 may dynamically break down, separate, divide, or split messages requested to be sent based on the connection signal strength as a factor of foliage amount and battery strength. It should be understood, that although specific ranges of datagrams were listed above, any suitable range of datagrams may be used to send the one or more messages based on device conditions.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A mobile device comprising:
a transmitter configured to send a first message having a message segment to a response network; and
processing circuitry configured to:
receive a request to send a second message to the response network, and
send the second message represented as an enabled redundant bit, a message sequence identifier identifying the first message, and an information segment identifier identifying the message segment when an entropy factor indicates a threshold similarity of the second message with respect to the first message.

2. The mobile device of claim 1, wherein the processing circuitry is configured to determine the entropy factor based at least on a similarity of meaning between the first message and the second message, or an amount of repeated text of the first message used in the second message.

3. The mobile device of claim 1, wherein the processing circuitry is configured to send the second message represented as the enabled redundant bit, the message sequence identifier identifying the first message, and the information segment identifier identifying the message segment when the entropy factor is below a threshold value, wherein the threshold value represents a resource level value associated with an amount of available resources of the mobile device, or a resource level value associated with an amount of available resources of the response network.

4. The mobile device of claim 3, wherein the processing circuitry is configured to determine the resource level value based at least on a network congestion level associated with the response network, a battery level of the mobile device, a link budget associated with the response network and the mobile device, or a thermal level of the mobile device.

5. The mobile device of claim 1, wherein the processing circuitry is configured to identify an information segment of the second message that corresponds the message segment.

6. The mobile device of claim 5, wherein the processing circuitry is configured to determine the information segment identifier based on the information segment of the second message corresponding to the message segment.

7. The mobile device of claim 1, wherein the processing circuitry is configured to receive an additional request to send a third message to the response network, the third message having a third message segment.

8. The mobile device of claim 7, wherein the processing circuitry is configured to determine a second entropy factor associated with the third message, the second entropy factor indicating a similarity of the third message with respect to the first message, and send the third message represented as an additional enabled redundant bit based on the second entropy factor.

9. A method for communication using a mobile device, comprising:
   receiving, at processing circuitry of the mobile device, a first request to send a first message;
   sending, via a transmitter of the mobile device, the first message;
   receiving, at the processing circuitry, a second request to send a second message;
   dividing, via the processing circuitry of the mobile device, the first message into a plurality of information segments;
   determining, via the processing circuitry, that the second message comprises an information segment of the plurality of information segments of the first message;
   determining, via the processing circuitry, an entropy factor indicating a threshold similarity of the second message with respect to the first message; and
   sending, via the transmitter, the second message represented as an enabled redundant bit and an information segment identifier identifying the information segment based on the entropy factor.

10. The method of claim 9, wherein the threshold similarity is associated at least with a meaning of the first message and the second message, an amount of repeated text of the first message used in the second message, or both.

11. The method of claim 9, comprising receiving, at the processing circuitry, an amount of foliage at a location of the mobile device, and dividing the first message into a plurality of smaller messages based on the amount of foliage at the location of the mobile device exceeding a foliage threshold.

12. The method of claim 11, wherein a size of a smaller message of the plurality of smaller messages is based on the amount of foliage.

13. The method of claim 12, wherein receiving the amount of foliage comprises receiving, at the processing circuitry, image data captured by an image sensor of the mobile device.

14. A mobile device comprising:
   a transmitter configured to send one or more messages to a response network; and
   processing circuitry configured to:
      receive a request to send a message to the response network, the message having a first information segment and a second information segment,
      determine the first information segment corresponds to a previously sent information segment of a previously sent message based on an entropy factor indicating a threshold similarity of the message with the previously sent message, and
      based on the entropy factor, send the first information segment represented as an enabled redundant bit, a message sequence identifier identifying the previously sent message, and an information segment identifier indicating that the first information segment corresponds to the previously sent information segment, and send the second information segment to the response network.

15. The mobile device of claim 14, wherein the enabled redundant bit indicates that at least a portion of the message repeats at least a portion of the previously sent message.

16. The mobile device of claim 14, wherein the entropy factor is based at least on a similarity of meaning between the message and the previously sent message, an amount of repeated text of the previously sent message used in the message, or both.

17. The mobile device of claim 16, wherein the processing circuitry is configured to send the message represented as the enabled redundant bit, the message sequence identifier, and the information segment identifier to the response network based on the entropy factor being below a threshold entropy factor.

18. The mobile device of claim 1, wherein the message sequence identifier is associated with a sequential order of the first message with respect to the second message.

19. The method of claim 9, comprising sending, via the transmitter, the second message represented as the enabled redundant bit and the information segment identifier when the entropy factor is below a threshold value, wherein the threshold value represents a resource level value associated with an amount of available resources of the mobile device, or a resource level value associated with an amount of available resources of a response network.

20. The mobile device of claim 17, wherein the threshold entropy factor is based on a resource level value associated with an amount of available resources of the mobile device, or a resource level value associated with an amount of available resources of the response network.

* * * * *